(12) United States Patent
Yabunouchi et al.

(10) Patent No.: US 7,081,427 B2
(45) Date of Patent: Jul. 25, 2006

(54) SOLID CATALYST COMPONENT FOR OLEFIN POLYMERIZATION

(75) Inventors: Nobuhiro Yabunouchi, Ichihara (JP); Takanori Sadashima, Ichihara (JP); Hideo Funabashi, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 10/473,517

(22) PCT Filed: Apr. 19, 2002

(86) PCT No.: PCT/JP02/03938

§ 371 (c)(1),
(2), (4) Date: Sep. 30, 2003

(87) PCT Pub. No.: WO02/088193

PCT Pub. Date: Nov. 7, 2002

(65) Prior Publication Data

US 2004/0102310 A1 May 27, 2004

(30) Foreign Application Priority Data

Apr. 23, 2001 (JP) .............. 2001-124428
Apr. 23, 2001 (JP) .............. 2001-124429

(51) Int. Cl.
*B01J 31/00* (2006.01)
*B01J 37/00* (2006.01)
*C08F 4/02* (2006.01)
*C08F 4/60* (2006.01)

(52) U.S. Cl. .............. 502/103; 502/102; 502/115; 502/118; 526/124.3

(58) Field of Classification Search .............. 502/103, 502/102, 115, 118; 526/124.3
See application file for complete search history.

(56) References Cited

U.S. PATENT DOCUMENTS

| | | | |
|---|---|---|---|
| 5,331,086 A | * | 7/1994 | Stricklen et al. ............. 528/493 |
| 6,204,215 B1 | | 3/2001 | Kadoi et al. ................. 502/103 |
| 6,281,301 B1 | * | 8/2001 | Morini et al. ............. 526/124.3 |
| 6,294,497 B1 | * | 9/2001 | Morini et al. ................ 502/127 |
| 6,323,293 B1 | * | 11/2001 | Shamshoum et al. ..... 526/125.3 |

(Continued)

FOREIGN PATENT DOCUMENTS

JP          59-206409           11/1984

(Continued)

*Primary Examiner*—J. A. Lorengo
*Assistant Examiner*—Jennine Brown
(74) *Attorney, Agent, or Firm*—Steptoe & Johnson LLP

(57) ABSTRACT

A solid catalyst component for olefin polymerization comprising titanium, magnesium and a compound of the general formula (I)

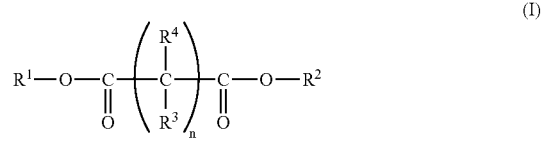

wherein $R^1$ and $R^2$ are independently a $C_3$ straight or branched hydrocarbon group, $R^3$ is hydrogen or a $C_{1-4}$ straight hydrocarbon group, $R^4$ is a $C_{1-4}$ straight or branched hydrocarbon group or a $C_{3-4}$ aliphatic cyclic hydrocarbon group when $R^3$ is hydrogen, $R^4$ is the same $C_{1-4}$ straight hydrocarbon group as $R^3$ when $R^3$ is a $C_{1-4}$ straight hydrocarbon group, and n is an integer of 1 to 10. A catalyst for olefin polymerization, containing this catalyst component, obtains a high activity with high stereospecificity.

8 Claims, 1 Drawing Sheet

(A) SOLID CATALYST COMPONENT
(a) Ti COMPOUND
(b) Mg COMPOUND
(c) ELECTRON DONOR (GENERAL FORMULA(I))

...... ( I )

OLEFIN (d) (SILICON COMPOUND)
(B) ORGANIC ALUMINUM COMPOUND
(C) (ELECTRON DONOR COMPOUND)

U.S. PATENT DOCUMENTS

| | | | |
|---|---|---|---|
| 6,331,620 B1 * | 12/2001 | Kadoi et al. | 526/128 |
| 6,395,670 B1 * | 5/2002 | Morini et al. | 502/104 |
| 6,469,112 B1 * | 10/2002 | Cheng et al. | 526/124.3 |
| 6,495,639 B1 * | 12/2002 | Kadoi et al. | 526/124.3 |
| H2060 H * | 3/2003 | Spencer et al. | 502/110 |
| 6,541,582 B1 * | 4/2003 | Morini et al. | 526/124.3 |
| 6,605,562 B1 * | 8/2003 | Morini et al. | 502/127 |
| 6,699,814 B1 * | 3/2004 | Morini et al. | 502/127 |
| 6,777,365 B1 * | 8/2004 | Tanase et al. | 502/115 |
| 6,803,338 B1 * | 10/2004 | Yang et al. | 502/103 |

FOREIGN PATENT DOCUMENTS

| | | |
|---|---|---|
| JP | 8-157521 | 6/1996 |
| JP | 10-218930 | 8/1998 |
| JP | 11-60625 | 3/1999 |

* cited by examiner

SOLID CATALYST COMPONENT FOR OLEFIN POLYMERIZATION

TECHNICAL FIELD

The present invention relates to a solid catalyst component for olefin polymerization, particularly to a solid catalyst component and a catalyst for olefin polymerization which are used to produce homo- and co-polymers of alpha-olefins, and methods for producing the solid catalyst component and olefin polymer.

BACKGROUND ART

Various solid catalyst components comprising magnesium, titanium, halogen and an electron donor as essential components, have been proposed for catalyst components for olefin polymerization. It has been known that these solid catalyst components have high activity in olefin polymerization and alpha-olefins produced by using them have high stereospecificity. In particular, it has also been known that when an aromatic ester represented by phthalates is used as an electron donor to produce the solid catalyst components, they exhibit excellent catalyst properties.

However, compounds containing an aromatic ring have been disliked from the point of view of safety and hygiene.

On the other hand, for electron donors not containing an aromatic ring (non-aromatic electron donors), malonic ester derivatives are reported. For example, Japanese Patent Kokai H8(1996)-157521 shows non-aromatic compounds of the general formula (I)

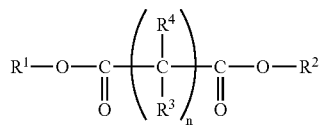

wherein $R^1$ and $R^2$ are independently a $C_{1-10}$ straight or branched hydrocarbon group, $R^3$ and $R^4$ are independently a $C_{3-20}$ saturated hydrocarbon or cyclic saturated hydrocarbon group containing at least one secondary or tertiary carbon atom, and n is 1.

However, the publication does not show a compound which is the same as the electron donors of the present invention.

The applicant of the present invention discloses compounds of the formula (I) wherein $R^1$ and $R^2$ are a $C_{1-20}$ straight or branched hydrocarbon group, $R^3$ and $R^4$ are a methyl group and n is an integer of 1 to 10, as an non-aromatic electron donor, in Japanese Patent Kokai H11 (1999)-60625.

The publication disclose 14 malonic esters, two compounds of which are the same as electron donors of the present invention.

However, catalyst systems using the two compounds were not evaluated.

Further, the applicant discloses various malonic esters containing compounds of the formula (I) wherein $R^1$ and $R^2$ are a $C_{1-20}$ straight or branched hydrocarbon group, $R^3$ is hydrogen, $R^4$ is a $C_{3-20}$ aliphatic cyclic hydrocarbon group and n is an integer of 1 to 10, as an non-aromatic electron donor, in Japanese Patent Kokai H11(1999)-199628.

However, the publication does not show a compound which is the same as the electron donors of the present invention.

As stated above, although some non-aromatic electron donors have been already known, an electron donor is demanded which can form a catalyst with higher stereospecificity and activity.

An object of the present invention is thus to provide a solid catalyst component and a catalyst for olefin polymerization which maintain high stereospecificity with a high activity but do not use an electron donor having problems of safety and hygiene, and methods for producing them.

DISCLOSURE OF THE INVENTION

The present invention provides a solid catalyst component for olefin polymerization comprising titanium, magnesium and a compound of the general formula (I).

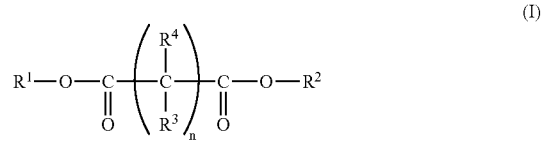

wherein $R^1$ and $R^2$ are independently a $C_3$ straight or branched hydrocarbon group, $R^3$ is hydrogen or a $C_{1-4}$ straight hydrocarbon group, $R^4$ is a $C_{1-4}$ straight or branched hydrocarbon group or a $C_{3-4}$ aliphatic cyclic hydrocarbon group when $R^3$ is hydrogen, $R^4$ is the same $C_{1-4}$ straight hydrocarbon group as $R^3$ when $R^3$ is a $C_{1-4}$ straight hydrocarbon group, and n is an integer of 1 to 10.

A solid catalyst component for olefin polymerization containing such as an electron donor can exhibits high polymerization activity, maintaining high stereospecificity.

Preferably n is 1, and both of $R^3$ and $R^4$ are methyl or ethyl.

In this case, more preferably both of $R^3$ and $R^4$ are methyl.

Preferably n is 1, $R^3$ is hydrogen, and $R^4$ is methyl or i-propyl.

More preferably $R^1$ and $R^2$ are n-propyl.

A second aspect of the present invention is a catalyst for olefin polymerization comprising:

(A) the above-mentioned solid catalyst component for olefin polymerization, and (B) an organic aluminium compound.

This catalyst preferably contains an electron donor (C). The electron donor is preferably an organic silicon compound.

A third aspect of the present invention is a method of producing a catalyst for olefin polymerization wherein at least a titanium compound, a magnesium compound and a compound of the general formula (I) are brought into contact with each other at 120° C. to 150° C.

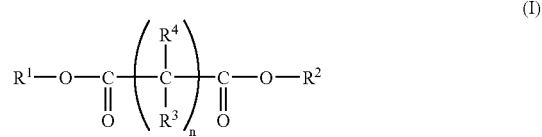

wherein $R^1$ and $R^2$ are independently a $C_3$ straight or branched hydrocarbon group, $R^3$ is hydrogen or a $C_{1-4}$ straight hydrocarbon group, $R^4$ is a $C_{1-4}$ straight or branched hydrocarbon group or a $C_{3-4}$ aliphatic cyclic hydrocarbon group when $R^3$ is hydrogen, $R^4$ is the same $C_{1-4}$ straight hydrocarbon group as $R^3$ when $R^3$ is a $C_{1-4}$ straight hydrocarbon group, and n is an integer of 1 to 10.

The method of the present invention preferably further comprises the step of washing the solid catalyst component obtained by the contact with an inert solvent at 100° C. to 150° C.

A fourth aspect of the present invention is a method of polymerizing olefins by using the above-mentioned catalyst.

BEST MODE FOR CARRYING OUT THE INVENTION

Figure 1:
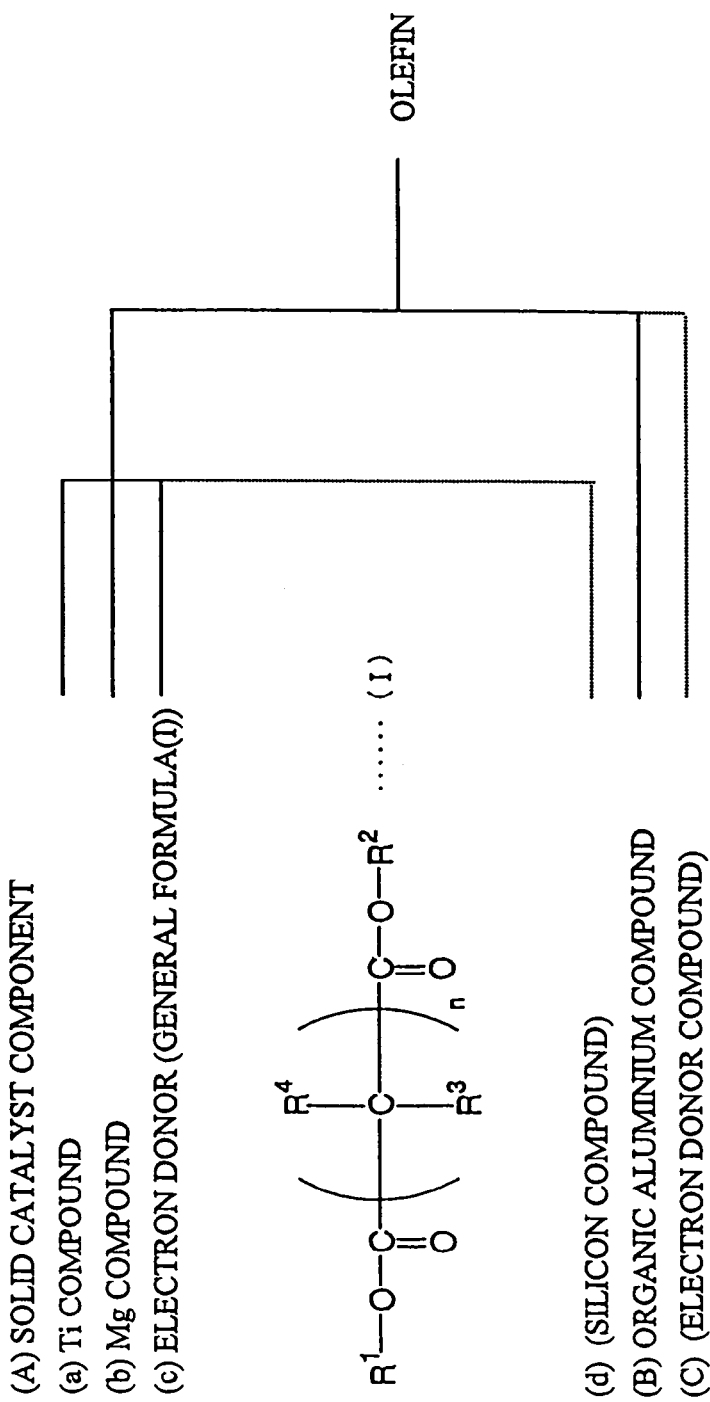
FIG. 1 is a flowchart showing an embodiment of the olefin polymerization of the present invention.

The catalyst components, preparation method, polymerization method and the like of the present invention will be explained below.

(1) Catalyst Component (A) Solid Catalyst Component

The solid catalyst component of the present invention may contain a titanium compound (a), a magnesium compound (b) and an electron donor (c) as shown below.

(a) Titanium Compound

A titanium compound of the general formula (II) may be used.

$$TiX^1_p(OR^5)_{4-p} \qquad (II)$$

In the formula (II), $X^1$ is a halogen atom, preferably a chlorine atom or a bromine atom, more preferably a chlorine atom. $R^5$ is a hydrocarbon group which may be saturated, unsaturated, straight, branched or cyclic; and further may have a hetero atom such as sulfur, nitrogen, oxygen, silicon and phosphorus. Preferably $R^5$ is a $C_{1-10}$ hydrocarbon group such as alkyl, alkenyl, cycloalkenyl, aryl or aralkyl, more preferably straight or branched alkyl. When the compound of the formula (II) has a plurality of $(OR^5)$'s, they may be the same or different from each other. Example of $R^5$ include methyl, ethyl, n-propyl, isopropyl, n-butyl, sec-butyl, isobutyl, pentyl, hexyl, heptyl, octyl, decyl, allyl, butenyl, cyclopentyl, cyclohexyl, cyclohexenyl, phenyl, tolyl, benzyl, and phenethyl. p is an integer of 0 to 4.

Examples of the titanium compound of formula (II) include tetraalkoxytitaniums such as tetramethoxytitanium, tetraethoxytitanium, tetra-n-propoxytitanium, tetraisopropoxytitanium, tetra-n-butoxytitanium, tetraisobutoxytitanium, tetracyclohexyloxytitanium, and tetraphenoxytitanium; titanium tetrahalides such as titanium tetrachloride, titanium tetrabromide, and titanium tetraiodide; alkoxytitanium trihalides such as methoxytitanium trichloride, ethoxytitanium trichloride, propoxytitanium trichloride, n-butoxytitanium trichloride, and ethoxytitanium tribromide; dialkoxytitanium dihalides such as dimethoxytitanium dichloride, diethoxytitanium dichloride, diisopropoxytitanium dichloride, di-n-propoxytitanium dichloride, and diethoxytitanium dibromide; trialkoxytitanium monohalides such as trimethoxytitanium chloride, triethoxytitanium chloride, triisopropoxytitanium chloride, tri-n-propoxytitanium chloride, and tri-n-butoxytitanium chloride. Of these catalysts, high-halogen titanium catalysts are preferred and titanium tetrachloride is particularly preferred. These titanium catalysts may be used either singly or as combined.

(b) Magnesium Catalyst

A magnesium catalyst of the general formula (III) may be used.

$$MgR^6R^7 \qquad (III)$$

In the formula (III), $R^6$ and $R^7$ are independently a hydrocarbon group, an $OR^8$ group wherein $R^8$ is a hydrocarbon group, or a halogen atom. Hydrocarbon groups include $C_{1-12}$ alkyl, cycloalkyl, aryl and aralkyl. For the $OR^8$ group, examples of $R^8$ include $C_{1-12}$ alkyl, cycloalkyl, aryl and aralkyl. Examples of halogen atoms include chlorine, bromine, iodine and fluorine.

Examples of the magnesium compounds of formula (III) include alkyl magnesiums and aryl magnesiums such as dimethylmagnesium, diethylmagnesium, diisopropylmagnesium, dibutylmagnesium, dihexylmagnesium, dioctylmagnesium, ethylbutylmagnesium, diphenylmagnesium, and dicyclohexylmagnesium; alkoxymagnesiums and aryloxymagnesiums such as dimethoxymagnesium, diethoxymagnesium, dipropoxymagnesium, dibutoxymagnesium, dihexyloxymagnesium, dioctoxymagnesium, diphenoxymagnesium, and dicyclohexyloxymagnesium; alkylmagnesium halides and arylmagnesium halides such as ethylmagnesium chloride, butylmagnesium chloride, hexylmagnesium chloride, isopropylmagnesium chloride, isobutylmagnesium chloride, t-butylmagnesium chloride, phenylmagnesium bromide, benzylmagnesium chloride, ethylmagnesium bromide, butylmagnesium bromide, phenylmagnesium bromide, and butylmagnesium iodide; alkoxylmagnesium halides and aryloxymagnesium halides such as butoxymagnesium chloride, cyclohexyloxymagnesium chloride, phenoxymagnesium chloride, ethoxymagnesium bromide, butoxymagnesium bromide, and ethoxymagnesium iodide; magnesium halides such as magnesium chloride, magnesium bromide, and magnesium iodide.

Of these magnesium compounds, magnesium halides, alkoxymagnesiums, alkylmagnesiums and alkylmagnesium halides are preferred.

The above magnesium compounds can be prepared from metal magnesium or compounds containing magnesium.

For example, metal magnesium is brought into contact with halogen and alcohol. Chlorine, bromine, iodine or fluorine may be used as halogen, preferably iodine. Methanol, ethanol, propanol, butanol or octanol may be used as alcohol.

Alternatively, alkoxymagnesium compounds represented by $Mg(OR^9)_2$ wherein $R^9$ is a $C_{1-20}$ hydrocarbon group may be brought into contact with a halide.

Halides include silicon tetrachloride, silicon tetrabromide, tin tetrachloride, tin tetrabromide and hydrogen chloride, preferably silicon tetrachloride.

Examples of $R^9$ include alkyl such as methyl, ethyl, propyl, isopropyl, butyl, isobutyl, hexyl and octyl; cyclohexyl; alkenyl such as ally, propenyl, and butenyl; aryl such as phenyl, tolyl and xylyl; aralkyl such as phenethyl and 3-phenylpropyl, preferably $C_{1-10}$ alkyl.

The magnesium compounds may be supported by a carrier such as silica, alumina and polystyrene. These magnesium compounds may be used either singly or as combined. They may contain another element such as halogen (e.g., iodine), silicon and aluminium as well as an electron donor such as alcohols, ethers and esters.

(c) Electron Donor

An electron donor of the general formula (I) may be used.

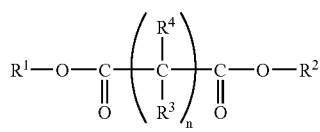

(I)

wherein $R^1$ and $R^2$ are independently a $C_3$ straight or branched hydrocarbon group, $R^3$ is hydrogen or a $C_{1-4}$ straight hydrocarbon group, $R^4$ is a $C_{1-4}$ straight or branched hydrocarbon group or a $C_{3-4}$ aliphatic cyclic hydrocarbon group when $R^3$ is hydrogen, $R^4$ is the same $C_{1-4}$ straight hydrocarbon group as $R^3$ when $R^3$ is a $C_{1-4}$ straight hydrocarbon group, and n is an integer of 1 to 10.

When $R^3$ is hydrogen, examples of $R^4$ include methyl, ethyl, n-propyl, i-propyl, n-butyl, i-butyl, sec-butyl, tert-butyl, cyclopropyl and cyclobutyl. Of these groups, methyl and i-propyl are preferred.

Examples of the compounds include malonic esters such as di-n-propyl methylmalonate, di-i-propyl methylmalonate, di-n-propyl ethylmalonate, di-i-propyl ethylmalonate, di-n-propyl n-propylmalonate, di-i-propyl n-propylmalonate, di-n-propyl i-propylmalonate, di-i-propyl i-propylmalonate, di-n-butyl n-butylmalonate, di-i-propyl n-butylmalonate, di-n-propyl i-butylmalonate, di-i-propyl i-butylmalonate, di-n-propyl sec-butylmalonate, di-i-propyl sec-butylmalonate, di-n-propyl tert-butylmalonate, di-i-propyl tert-butylmalonate, di-n-propyl cyclopropylmalonate, di-i-propyl cyclopropylmalonate, di-n-propyl cyclobutylmalonate, and di-i-propyl cyclobutylmalonate. Of these malonic esters, di-n-propyl methylmalonate and di-n-propyl i-propylmalonate are preferred. These compounds may be used either singly or as combined.

When $R^3$ is a $C_{1-4}$ straight hydrocarbon group, examples of $R^3$ and $R^4$ include methyl, ethyl, n-propyl, and n-butyl. Of these groups, methyl and ethyl are preferred. Methyl is particularly preferred.

Examples of the compounds include malonic esters such as di-n-propyl dimethylmalonate, di-i-propyl dimethylmalonate, di-n-propyl diethylmalonate, di-i-propyl diethylmalonate, di-n-propyl di-n-propylmalonate, di-i-propyl di-n-propylmalonate, di-n-propyl di-n-butylmalonate, and di-i-propyl di-n-butylmalonate. Of these malonic esters, di-n-propyl dimethylmalonate and di-n-propyl dietylmalonate are preferred. Di-n-propyl dimethylmalonate is particularly preferred. These compounds may be used either singly or as combined.

The above malonic esters can be synthesized by known methods, for example, the synthesis method described in "Jikken Kagaku Koza 4th", vol. 22, p. 59, Maruzen and transesterification described in "Shin Jikken Kagaku Koza", vol. 14-II, p. 931 and 1003, Maruzen.

(d) Silicon Compound

When a solid catalyst component is prepared, a silicon compound of the general formula (IV) may be used as a component (d) in addition to components (a), (b) and (c).

(IV)

In the formula (IV), $X^2$ is a halogen atom, preferably chlorine and bromine atoms, more preferably a chlorine atom. $R^{10}$ is a hydrocarbon group which may be saturated, unsaturated, straight, branched or cyclic; and further may have a hetero atom such as sulfur, nitrogen, oxygen, silicon and phosphorus. $R^{10}$ is preferably a $C_{1-10}$ hydrocarbon group, more preferably alkyl, alkenyl, cycloalkyl, cycloalkenyl, aryl or aralkyl. When a silicon compound contains a plurality of $(OR^{10})$'s, they may be the same or different from each other. Example of $R^{10}$ include methyl, ethyl, n-propyl, isopropyl, n-butyl, sec-butyl, isobutyl, pentyl, hexyl, heptyl, octyl, decyl, allyl, butenyl, cyclopentyl, cyclohexyl, cyclohexenyl, phenyl, tolyl, benzyl, and phenethyl. q is an integer of 0 to 4.

Examples of the silicon compound of formula (IV) include $SiCl_4$ (silicon tetrachloride), $CH_3OSiCl_3$, $(CH_3O)_2SiCl_2$, $(CH_3O)_3SiCl$, $C_2H_5OSiCl_3$, $(C_2H_5O)_2SiCl_2$, $(C_2H_5O)_3SiCl$, $C_3H_7OSiCl_3$, $(C_3H_7O)_2SiCl_2$, and $(C_3H_7O)_3SiCl$. Of these compounds, silicon tetrachloride is preferred. These silicon compounds may be used either singly or as combined.

The optional component (d), silicon compound, is used in a molar ratio, silicon compound/magnesium compound of generally 0.01 or more, preferably 0.10 or more. If the molar ratio is less than 0.01, the catalyst activity and stereospecificity cannot be sufficiently improved and the amount of fine powder in polymers produced increases.

The molar ratio of silicon compound/magnesium compound is preferably 10 or less, more preferably 2 or less. If it exceeds 10, the catalyst activity may be degraded.

(B) Organic Aluminium Compound

Organic aluminium compounds (B) for use in the present invention include compounds having an alkyl group, a halogen atom, a hydrogen atom or an alkoxy group; aluminoxanes; and mixture thereof. Examples of the organic aluminium compounds include trialkyaluminiums such as trimethylaluminium, triethylaluminium, triisopropyl aluminium, triisobutylaluminium, and trioctylaluminium; dialkyaluminium monochlorides such as diethylaluminium monochloride, diisopropylaluminium monochloride, diisobutylaluminium monochloride, and dioctylaluminium monochloride; alkylaluminium sesqui-halide such as ethylaluminium sesqui-chlorides; and linear aluminoxanes such as methylaluminoxane. Of these compounds, trialkyaluminiums with a $C_{1-5}$ lower alkyl group are preferred. Trimethylaluminium, triethylaluminium, tripropylaluminium, and triisobutylaluminium are particularly preferred. These compounds may be used either singly or as combined.

(C) Electron Donor

When preparing the catalyst for olefin polymerization of the present invention, if necessary, an electron donor (C) may be used. Alkoxy-containing organic silicon compounds, nitrogen-containing compounds, phosphorus-containing compounds and oxygen-containing compounds can be used as an electron donor (C). Preferably alkoxy-containing organic silicon compounds are used.

An electron donor (C) is generally used in a molar ratio to an organic aluminium compound (B) of 0.001 to 5, preferably 0.01 to 1.

Examples of alkoxy-containing organic silicon compounds include tetramethoxysilane, tetraethoxysilane, tetrabutoxysilane, tetraisobutoxysilane, trimethyl methoxysilane, trimethylethoxysilane, triethylmethoxysilane, triethylethoxysilane, ethylisopropyldimethoxysilane, propylisopropyldimethoxysilane, diisopropyldimethoxysilane, diisobutyldimethoxysilane, isopropylisobutyldimethoxysilane, di-t-butyldimethoxysilane, t-butylmethyldimethoxysilane, t-butylethyldimethoxysilane, t-butylpropyldimethoxysilane, t-butylisopropyldimethoxysilane, t-butylbutyldimethoxysilane, t-butylisobutyldimethoxysilane, t-butyl(s-butyl) dimethoxysilane, t-butylamyldimethoxysilane, t-butyl hexyldimethoxysilane, t-butylheptyldimethoxysilane, t-butyloctyldimethoxysilane, t-butylnonyldimethoxysilane, t-butyldecyldimethoxysilane, t-butyl(3,3,3-trifluoro methylpropyl)dimethoxysilane, t-cyclopentyl-t-butyl dimethoxysilane, cyclohexylmethyldimethoxysilane, cyclohexylisobutyldimethoxysilane, cyclohexyl-t-butyldimethoxysilane, dicyclopentyldimethoxysilane, bis(2-methylcyclopentyl)dimethoxysilane, bis(2,3-dimethylcyclopentyl)dimethoxysilane, diphenyldimethoxysilane, phenyltriethoxysilane, methyltrimethoxysilane, ethyltrimethoxysilane, propyltrimethoxysilane, isopropyltrimethoxysilane, butyltrimethoxysilane, isobutyltrimethoxysilane, t-butyltrimethoxysilane, s-butyltrimethoxysilane, amyltrimethoxysilane, isoamyltrimethoxysilane, cyclopentyltrimethoxysilane, cyclohexyltrimethoxysilane, norbornanetrimethoxysilane, indenyltrimethoxysilane, 2-methylcyclopentyl trimethoxysilane, cyclopentyl(t-butoxy) dimethoxysilane, isopropyl(t-butoxy)dimethoxysilane, t-butyl(isobutoxy) dimethoxysilane, t-butyl(t-butoxy) dimethoxysilane, thexyltrimethoxysilane, thexylisopropoxydimethoxysilane, thexyl(t-butoxy)dimethoxysilane, thexylmethyldimethoxy silane, thexylethyldimethoxysilane, thexylisopropyldimethoxy silane, thexylcyclopentyldimethoxysilane, thexylmyristyldimethoxysilane, and thexylcyclohexyl dimethoxysilane. These organic silicon compounds may be used either singly or as combined.

Examples of nitrogen-containing compounds include 2,6-substituted piperidines such as 2,6-diisopropylpiperidine, 2,6-diisopropyl-4-methylpiperidine, and N-methyl-2,2,6,6-tetramethylpiperidine; 2,5-substitued azolidines such as 2,5-diisopropylazolidine, and N-methyl-2,2,5,5-tetramethylazolidine; substituted methylenediamines such as N,N,N',N'-tetramethylmethylenediamine, and N,N,N',N'-tetraethylmethylenediamine; and substituted imidazolidines such as 1,3-dibenzylimidazolidine and 1,3-dibenzyl-2-phenylimidazolidine.

Examples of phosphorus-containing compounds include phosphites such as triethyl phosphite, tri-n-propyl phosphite, triisopropyl phosphate, tri-n-butyl phosphite, triisobutyl phosphite, diethyl-n-butyl phosphite, and diethylphenyl phosphate.

Examples of oxygen-containing compounds include 2,5-substituted tetrahydrofuranes such as 2,2,5,5-tetramethyltetrahydrofurane, and 2,2,5,5-tetraethyl tetrahydrofurane; and dimethoxymethane derivatives such as 1,1-dimethoxy-2,3,4,5-tetrachlorocyclopentadiene, 9,9-dimethoxyfluorene, and diphenyldimethoxymethane.

Polyether compounds of the general formula (V) are also used as an oxygen-containing compound.

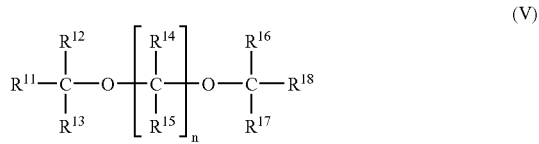

(V)

wherein n is an integer of 2 to 10, $R^{11}$ to $R^{18}$ is a substituent containing at least one element selected from carbon, hydrogen, oxygen, halogen, nitrogen, sulfur, phosphorus, boron and silicon, $R^{14}$ and $R^{15}$ may be the same or different, any substituents of $R^{11}$ to $R^{18}$, preferably $R^{14}$ and $R^{15}$, can form a ring other than a benzene ring together, and the main chain may contain an atom other than a carbon atom.

Examples of polyether compounds include 2-(2-ethylhexyl)-1,3-dimethoxypropane, 2-isopropyl-1,3-dimethoxypropane, 2-butyl-1,3-dimethoxypropane, 2-s-butyl-1,3-dimethoxypropane, 2-cyclohexyl-1,3-dimethoxypropane, 2-phenyl-1,3-dimethoxypropane, 2-kumil-1,3-dimethoxypropane, 2-(2-phenylethyl)-1,3-dimethoxypropane, 2-(2-cyclohexyl ethyl)-1,3-dimethoxypropane, 2-(p-chlorophenyl)-1,3-dimethoxypropane, 2-(diphenylmethyl)-1,3-dimetoxypropane, 2-(1-naphthyl)-1,3-dimethoxypropane, 2-(2-fluorophenyl)-1,3-dimethoxypropane, 2-(1-decahydronaphthyl)-1,3-dimethoxy propane, 2-(p-t-butylphenyl)-1,3-dimethoxypropane, 2,2-dicyclohexyl-1,3-dimethoxypropane, 2,2-dicyclopentyl-1,3-dimethoxypropane, 2,2-diethyl-1,3-dimethoxypropane, 2,2-dipropyl-1,3-dimethoxypropane, 2,2-diisopropyl-1,3-dimethoxypropane, 2,2-dibutyl-1,3-dimethoxypropane, 2-methyl-2-propyl-1,3-dimethoxypropane, 2-methyl-2-benzyl-1,3-dimethoxypropane, 2-methyl-2-ethyl-1,3-dimethoxypropane, 2-methyl-2-isopropyl-1,3-dimethoxypropane, 2-methyl-2-phenyl-1,3-dimethoxypropane, 2-methyl-2-cyclohexyl-1,3-dimethoxy propane, 2,2-bis(p-chlorophenyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl-1,3-dimethoxypropane, 2-(1-methylbutyl)-2-isopropyl-1,3-dimethoxypropane, 2-(1-methylbutyl)-2-s-butyl-1,3-dimethoxypropane, 2,2-di-s-butyl-1,3-dimethoxypropane, 2,2-di-t-butyl-1,3-dimethoxypropane, 2,2-dineopentyl-1,3-dimethoxypropane, 2-isopropyl-2-isopentyl-1,3-dimethoxy propane, 2-phenyl-2-isopropyl-1,3-dimethoxypropane, 2-phenyl-2-s-butyl-1,3-dimethoxypropane, 2-benzyl-2-isopropyl-1,3-dimethoxypropane, 2-benzyl-2-s-butyl-1,3-dimethoxy propane, 2-phenyl-2-benzyl-1,3-dimethoxypropane, 2-cyclopentyl-2-isopropyl-1,3-dimethoxypropane, 2-cyclopentyl-2-s-butyl-1,3-dimethoxypropane, 2-cyclohexyl-2-isopropyl-1,3-dimethoxypropane, 2-cyclohexyl-2-s-butyl-1,3-dimethoxypropane, 2-isopropyl-2-s-butyl-1,3-dimethoxy propane, 2-cyclohexyl-2-cyclohexylmethyl-1,3-dimethoxy propane, 2,3-diphenyl-1,4-diethoxybutane, 2,3-dicyclohexyl-1,4-diethoxybutane, 2,2-dibenzyl-1,4-diethoxybutane, 2,3-dicyclohexyl-1,4-diethoxybutane, 2,3-diisopropyl-1,4-diethoxybutane, 2,2-bis(p-methylphenyl)-1,4-dimethoxybutane, 2,3-bis(p-chlorophenyl)-1,4-dimethoxybutane, 2,3-bis(p-fluorophenyl)-1,4-dimethoxybutane, 2,4-diphenyl-1,5-dimethoxypentane, 2,5-diphenyl-1,5-dimethoxyhexane, 2,4-diisopropyl-1,5-dimethoxypentane, 2,4-diisobutyl-1,5-dimethoxypentane, 2,4-diisoamyl-1,5-dimethoxypentane, 3-methoxymethyltetrahydrofuran, 3-methoxymethyldioxane, 1,3-diisobutoxypropane, 1,2-diisobutoxypropane, 1,2-diisobutoxy ethane, 1,3-diisoamyloxypropane, 1,3-diisoneopentyloxy ethane, 1,3-dineopentyloxypropane, 2,2-tetramethylene-1,3-dimethoxypropane, 2,2-pentamethylene-1,3-dimethoxypropane, 2,2-hexamethylene-1,3-dimethoxypropane, 1,2-bis (methoxymethyl)cyclohexane, 2,8-dioxaspiro[5,5]undecane, 3,7-dioxabicyclo[3,3,1]nonane, 3,7-dioxabicyclo[3,3,0] octane, 3,3-diisobutyl-1,5-oxononane, 6,6-diisobutyl dioxyheptane, 1,1-dimethoxymethylcyclopentane, 1,1-bis (dimethoxymethyl)cyclohexane, 1,1-bis(methoxymethyl) bicyclo[2,2,1]heptane, 1,1-dimethoxymethylcyclopentane, 2-methyl-2-methoxymethyl-1,3-dimethoxypropane, 2-cyclohexyl-2-ethoxymethyl-1,3-diethoxypropane, 2-cyclohexyl-2-methoxy methyl-1,3-dimethoxypropane, 2,2-diisobutyl-1,3-dimethoxy cyclohexane, 2-isopropyl-2-isoamyl-1,3-dimethoxycyclohexane, 2-cyclohexyl-2-methoxymethyl-1,3-dimethoxycyclohexane, 2-isopropyl-2-methoxymethyl-1,3-dimethoxycyclohexane, 2-isobutyl-2-methoxymethyl-1,3-dimethoxycyclohexane, 2-cyclohexyl-2-ethoxymethyl-1,3-diethoxycyclohexane, 2-cyclohexyl-2-ethoxymethyl-1,3-dimethoxycyclohexane, 2-isopropyl-2-ethoxymethyl-1,3-diethoxycyclohexane, 2-isopropyl-2-ethoxymethyl-1,3-dimethoxycyclohexane, 2-isobutyl-2-ethoxymethyl-1,3-diethoxycyclohexane, 2-isobutyl-2-ethoxymethyl-1,3-dimethoxycyclohexane, tris(p-methoxy phenyl)phosphine, methylphenylbis(methoxymethyl)silane, diphenylbis(methoxymethyl)silane, methylcyclohexylbis(methoxymethyl)silane, di-t-butylbis(methoxymethyl)silane, cyclohexyl-t-butylbis(methoxymethyl)silane, and i-propyl-t-butylbis(methoxymethyl)silane.

Of these compounds, 1,3-diether compounds are preferably used, more preferably 2,2-diisobutyl-1,3-dimethoxypropane, 2-isopropyl-2-isopentyl-1,3-dimethoxy propane, 2,2-dicyclohexyl-1,3-dimethoxypropane, 2,2-bis(cyclohexylmethyl)-1,3-dimethoxypropane, 2-cyclohexyl-2-isopropyl-1,3-dimethoxypropane, 2-isopropyl-2-s-butyl-1,3-dimethoxypropane, 2,2-diphenyl-1,3-dimethoxy propane, and 2-cyclopentyl-2-isopropyl-1,3-dimethoxypropane.

These compounds may be used either singly or as combined.

(2) Preparation of Solid Catalyst Component

A solid catalyst component (A) can be prepared by bringing titanium compound (a), magnesium compound (b), electron donor (c) and, if necessary, silicon compound (d) into contact with each other by any known method.

Some known methods are shown in Japanese Patent Kokai S53(1978)-43094, S55(1980)-135102, S55(1980)-135103 and S56(1981)-18606. For example, there are the following methods:

(1) A magnesium compound or a complex of magnesium compound and a diester of malonic acid is grinded in the presence of diester of malonic acid and, if desired, grinding promoter, and then subjected to reaction with a titanium compound.
(2) A liquid non-reducible magnesium compound is reacted with a liquid titanium compound in the presence of a diester of malonic acid, thereby precipitating a solid titanium composite.
(3) The product obtained by the above (1) or (2) method is reacted with a titanium compound.
(4) The product obtained by the above (1) or (2) method is further reacted with a diester of malonic acid and a titanium compound.
(5) A magnesium compound or a complex of magnesium compound and a diester of malonic acid is grinded in the presence of diester of malonic acid, titanium compound and, if desired, grinding promoter, and then subjected to treatment with halogen or halide.

In addition to the above methods, a solid catalyst component (A) may also be prepared by methods described in Japanese Patent Kokai S56(1981)-166205, S57(1982)-63309, S57(1982)-190004, S57(1982)-300407 and S58 (1983)-47003.

Further, a solid catalyst component may be prepared by supporting an above-mentioned magnesium compound on an oxide of an element of Groups II to IV such as silicon oxide and magnesium oxide, or a composite oxide containing at least one oxide of an element of Groups II to IV such as silica-alumina; and contacting this solid with an electron donor and titanium compound in a solvent at 0° C. to 200° C., preferably 10° C. to 150° C. for 2 minutes to 24 hours.

A titanium compound (a) is generally used in an amount of 0.5 to 100 moles, preferably 1 to 50 moles, relative to 1 mole of magnesium of a magnesium compound (b). An electron donor (c) is generally used in an amount of 0.01 to 10 moles, preferably 0.05 to 1.0 moles, relative to 1 mole of magnesium of a magnesium compound (b). Further, silicon tetrachloride may be added as a silicon compound (d).

The contact of the components (a), (b) and (c), or (a), (b), (c) and (d) is preferably effected at 120° C. to 150° C., preferably 125° C. to 140° C. after these components are mixed. If the contact temperature is not in this range, the catalyst activity and stereospecificity may not be sufficiently improved. The contact is generally conducted for 1 minute to 24 hours, preferably 10 minutes to 6 hours. The reaction pressure is generally 0 to 50 kg/cm$^2$G, preferably 0 to 10 kg/cm$^2$G, but it may change dependent on the contact temperature, the type of solvent, if used, and the like. From the point of view of uniformity of catalyst and contact efficiency, stirring is preferred during the contact operation.

The contact with a titanium compound is preferably repeated twice or more to be sufficiently supported on a magnesium compound as a carrier. When a solvent is used in the contact operation, it is generally used in an amount of 5,000 ml or less, preferably 10 to 1,000 ml or less relative to 1 mole of a titanium compound. If the ratio is not in the range, the uniformity of catalyst and contact efficiency may be decreased.

The solid catalyst component obtained by such contact is preferably washed with an inert solvent at 100° C. to 150° C. preferably 120° C. to 140° C. If the washing temperature is not in the range, the catalyst activity and stereospecificity may not be sufficiently improved. Inert solvents include aliphatic hydrocarbons such as octane and decane; aliphatic cyclic hydrocarbons such as methylcyclohexane and ethylcyclohexane; aromaic hydrocarbons such as toluene and xylene; halogenated hydrocarbons such as tetrachloroethane and chlorofluorocarbon; and mixture thereof. Of these solvents, aliphatic hydrocarbons are preferred.

Preferred methods for washing include, but not limited to, decantation and filtration. The amount of an invert solvent, washing time and number of washings are, but not limited thereto, generally 100 to 100,000 ml relative to 1 mole of a magnesium compound, preferably 100 to 50,000 ml; generally 1 minute to 24 hours, preferably 10 minutes to 6 hours. If the ratio is not in the range, the component may be incompletely washed.

The condition of pressure is generally 0 to 50 kg/cm$^2$G, preferably 0 to 10 kg/cm$^2$G, but it may change dependent on the contact temperature, the type of solvent and the like. From the point of view of uniformity and efficiency of washing, stirring is preferred. The solid catalyst component obtained can be stored in an inert solvent such as hydrocarbons or dry atmosphere.

(3) Polymerization

The amounts of components forming the catalyst for olefin polymerization of the present invention will be explained. A solid catalyst component (A) is generally used in an amount of 0.0005 to 1 mmol, in terms of a titanium atom, relative to 1 liter of reaction system. An organic aluminium compound (B) is generally used in an aluminium/titanium atomic ratio of 1 to 1,000, preferably 10 to 500. If the atomic ratio is not in the range, a desired catalyst activity may not be obtained. An electron donor (C) is generally used in a molar ratio to an organic aluminium compound (B) ((C)/(B)) of 0.02 to 2.0, preferably 0.05 to 1.0. If the molar ratio is not in the range, a desired catalyst activity may not be obtained.

Alpha-olefins of the general formula (VI) are preferably used as an olefin for use in the present invention.

In the formula (VI), $R^{19}$ is a hydrogen atom or a hydrocarbon group which may be saturated, unsaturated, straight, branched or cyclic. Examples of $R^{19}$ include ethylene, propylene, 1-butene, 1-pentene, 1-hexene, 1-heptene, 1-octene, 1-decene, 3-methyl-1-pentene, 4-methyl-1-pentene, and vinylcyclohexane. These olefins may be used either singly or as combined.

Of these olefins, ethylene and propylene are preferred. Further, dienes such as butadiene and other various olefins may be used.

For the olefin polymerization of the present invention, if desired, pre-polymerization of an olefin is carried out, thereafter followed by final polymerization. In this case, an olefin is generally pre-polymerized at 1 to 100° C. under normal pressure to 50 kg/cm²G in the presence of a catalyst obtained by mixing solid catalyst component (A), organic aluminium compound (B) and electron donor (C) in the certain ratios. Next, an olefin is finally polymerized in the presence of a catalyst and the product obtained by the pre-polymerization. A polymerization method is not limited in final polymerization. Any one of solution polymerization, slurry polymerization, vapor-phase polymerization or bulk polymerization may be applied. Further either of batch polymerization or continuous polymerization as well as two- or multi-stage polymerization under different conditions may also be applied.

Regarding reaction conditions, the polymerization pressure is, but not limited to, generally atmospheric pressure to 80 kg/cm²G, preferably 2 to 50 kg/cm²G, and the polymerization temperature is generally 0 to 200° C., preferably 30 to 100° C. The polymerization time cannot be indiscriminately determined since it may change dependent on the type of olefin and polymerization temperature. However it is generally about 5 minutes to about 20 hours, preferably about 10 minutes to about 10 hours.

The molecular weight of a polymer can be adjusted by the addition of a chain transfer agent, preferably hydrogen. If desire, the polymerization may be effected in the presence of an inert gas such as nitrogen.

For the catalyst components of the present invention, an olefin may be introduced for polymerization immediately after the components (A), (B) and (C) are mixed in certain ratios and contacted with each other. Alternatively, an olefin may be introduced for polymerization after the components are contacted and then aged for 0.2 to 3 hours. The components may be suspended in an inert solvent, olefin or the like and then supplied for use.

In the present invention, post-treatment after polymerization may be effected in any ordinary manner. For example, in vapor-phase polymerization, nitrogen stream may be introduced into polymer powder taken out of a reactor after polymerization to remove olefin and the like contained therein. If desired, the polymer may be pelletized through an extruder. In this case, a small amount of water, alcohol or the like may be added to completely inactivate a catalyst. In bulk polymerization, a polymer can be pelletized after monomers have been completely removed from the polymer taken out of a reactor after polymerization.

EXAMPLES

Next, the present invention will be concretely described by the following examples, which are not intended to restrict the scope of the present invention. The intrinsic viscosity [η] and stereospecificity [mmmm] of polymers were measured in the manners mentioned below. Intrinsic viscosity [η]: A polymer was dissolved in decalin and its intrinsic viscosity was measured at 135° C. Stereospecificity [mmmm]: A polymer was dissolved in 1,2,4-trichlorobenzene and its stereospecificity was determined by using signals for methyl groups measured in a proton complete decoupling method at 130° C. using $^{13}$C-NMR (EX-400, Nippon Densi Co.)

The unit [mmmm] means an isotactic fraction in a pentad unit of a polypropylene molecular chain obtained from $^{13}$C-NMR spectrometry, as proposed by A. Zambelli et al. in Macromolecules, 6, 925 (1973).

The attribution of peaks of $^{13}$C-NMR spectrometry was determined according to Macromolecules, 8, 687 (1975), A. Zambelli et al.

Example 1

(1) Preparation of Solid Catalyst Component

A 0.5-little three-neck flask equipped with a stirrer was purged with nitrogen gas and then 60 ml of dewatered octane and 16.0 g (140 mmol) of diethoxymagnesium were added. After heating to 40° C., 2.4 ml (35 mmol) of silicon tetrachloride was added thereto and heated with stirring for 20 minutes, followed by addition of 2.5 g (12.7 ml) of n-propyl 2,2-dimethylmalonate. After heating to 60° C., 77 ml (700 mmol) of titanium tetrachloride was dropwise added and subjected to contact reaction with stirring for 2 hours at an inner temperature of 125° C. Thereafter, the stirring was stopped to let solid precipitate, and supernatant was then removed. To the solid was added 100 ml of dewatered octane. The mixture was heated to 125° C. with stirring and maintained for 1 minute. The stirring was stopped to let solid precipitate, and supernatant was removed. This washing operation was repeated 7 times. To the resulting solid was further added 122 ml (1,120 mmol) of titanium tetrachloride and subjected to contact reaction with stirring at an inner temperature of 125° C. for 2 hours. Thereafter the above washing operation with 100 ml of dewatered octane was similarly repeated 7 time to yield a solid catalyst component in which the amount of titanium carried was 2.43 wt. %.

(2) Slurry Polymerization of Propylene

A 1-little stainless autoclave equipped with a stirrer was sufficiently dried and purged with nitrogen, and 400 ml of dewatered heptane was added thereto at room temperature. 2.0 mmol of triethylaluminium, 0.25 mmol of dicyclopentylmethoxysilane and 0.005 mmol, in terms of Ti atom, of the solid catalyst component obtained in (1) were added. Hydrogen was introduced thereto in a pressure of 1 kg/cm²G. The reaction system was then heated to 80° C. and pressurized to the total pressure of 8 kg/cm²G while introducing propylene, and subjected to polymerization for 60 minutes. Thereafter it was cooled and degassed to remove the content. The content was put in 2 litters of methanol to inactivate the catalyst, filtered and dried in vacuum to obtain 132 g of a propylene polymer (activity: 552 Kg-PP/g-Ti). The polymer had [η] of 1.15 dl/g and the stereospecificity [mmmm] of 97.7%.

Comparative Example 1

A catalyst was prepared and propylene was polymerized in the same manner as Example 1 except that diethyl 2,2-dimethylmalonate was used in place of di-n-propyl 2,2-dimethylmalonate in the preparation of a solid catalyst component. The amount of Ti carried of the solid catalyst component thus obtained was 1.67 wt. %. The yield of the polymer was 89.0 g. The polymerization activity was 372 kg-PP/g-Ti. The polymer had [η] of 1.03 dl/g and the stereospecificity [mmmm] of 97.2%.

Comparative Example 2

A catalyst was prepared and propylene was polymerized in the same manner as Example 1 except that di-n-butyl 2,2-dimethylmalonate was used in place of di-n-propyl 2,2-dimethylmalonate in the preparation of a solid catalyst component. The amount of Ti carried of the solid catalyst component thus obtained was 2.21 wt. %. The yield of the polymer was 94.8 g. The polymerization activity was 396 kg-PP/g-Ti. The polymer had [η] of 1.14 dl/g and the stereospecificity [mmmm] of 97.8%.

Example 2

A catalyst was prepared and propylene was polymerized in the same manner as Example 1 except that di-n-propyl 2,2-diethylmalonate was used in place of di-n-propyl 2,2-dimethylmalonate in the preparation of a solid catalyst component. The amount of Ti carried of the solid catalyst component thus obtained was 2.41 wt. %. The yield of the polymer was 115 g. The polymerization activity was 481 kg-PP/g-Ti. The polymer had [η] of 1.05 dl/g and the stereospecificity [mmmm] of 97.4%.

Example 3

(1) Preparation of Solid Catalyst Component

A 0.5-little three-neck flask equipped with a stirrer was purged with nitrogen gas and then 60 ml of dewatered ethylbenzene and 10.0 g (87.3 mmol) of diethoxy magnesium were added. After adding dropwise 40 ml (364 mmol) of titanium tetrachloride thereto at 10° C., the mixture was heated to 30° C. and then stirred for 1 hour. After the mixture was further heated to 90° C., 1.57 g (8.0 mmol) of di-n-propyl 2,2-dimethylmalonate was added and subjected to contact reaction with stirring for 2 hours at an inner temperature of 125° C. Thereafter, the stirring was stopped to let solid precipitate and supernatant was removed. To the solid was added 200 ml of dewatered ethylbenzene. It was heated to 125° C. with stirring and maintained for 1 minute. The stirring was stopped to let solid precipitate and supernatant was then removed. This washing operation was repeated twice. To the resulting solid were further added 60 ml of ethylbenzene and 40 ml (364 mmol) of titanium tetrachloride, and subjected to contact reaction with stirring at an inner temperature of 125° C. for 2 hours. Thereafter a washing operation with 200 ml of dewatered octane was similarly repeated 7 time to yield a solid catalyst component in which the amount of titanium carried was 2.32 wt. %.

(2) Slurry Polymerization of Propylene

Propylene was polymerized in the same manner as Example 1. As a result, the yield of the polymer was 148 g. The polymerization activity was 620 kg-PP/g-Ti. The polymer had [η] of 1.13 dl/g and the stereospecificity [mmmm] of 96.8%.

Example 4

(1) Preparation of Solid Catalyst Component

A catalyst was prepared in the same manner as Example 1 except that 2.6 g (12.7 mmol) of di-n-propyl 2-isopropylmalonate was added in place of 2.5 g (12.7 mmol) of n-propyl 2,2-dimethylmalonate. The amount of Ti carried was 2.43 wt. %.

(2) Slurry Polymerization of Propylene

Propylene was polymerized in the same manner as Example 1. As a result, the yield of the polymer was 167 g. The polymerization activity was 702 kg-PP/g-Ti. The polymer had [η] of 1.13 dl/g and the stereospecificity [mmmm] of 97.8%.

Comparative Example 3

A catalyst was prepared and propylene was polymerized in the same manner as Example 4 except that diethyl 2-isopropylmalonate was used in place of di-n-propyl 2-isopropylmalonate in the preparation of a solid catalyst component. The amount of Ti carried of the solid catalyst component thus obtained was 1.22 wt. %. The yield of the polymer was 81.0 g. The polymerization activity was 338 kg-PP/g-Ti. The polymer had [η] of 1.02 dl/g and the stereospecificity [mmmm] of 97.0%.

Comparative Example 4

A catalyst was prepared and propylene was polymerized in the same manner as Example 4 except that di-n-butyl 2-isopropylmalonate was used in place of di-n-propyl 2-isopropylmalonate in the preparation of a solid catalyst component. The amount of Ti carried of the solid catalyst component thus obtained was 1.60 wt. %. The yield of the polymer was 115 g. The polymerization activity was 481 kg-PP/g-Ti. The polymer had [7] of 1.06 dl/g and the stereospecificity [mmmm] of 97.8%.

Example 5

A catalyst was prepared and propylene was polymerized in the same manner as Example 4 except that di-n-propyl 2-methylmalonate was used in place of di-n-propyl 2-isopropyl-malonate in the preparation of a solid catalyst component. The amount of Ti carried of the solid catalyst component thus obtained was 1.20 wt. %. The yield of the polymer was 131 g. The polymerization activity was 768 kg-PP/g-Ti. The polymer had [7] of 1.20 dl/g and the stereospecificity [mmmm] of 97.4%.

Example 6

(1) Preparation of Solid Catalyst Component

A catalyst was prepared in the same manner as Example 3 except that 1.84 g (8.0 mmol) of di-n-propyl 2-cyclopropylmalonate was added in place of n-propyl 2,2-dimethylmalonate. The amount of Ti carried was 2.61 wt. %.

(2) Slurry Polymerization of Propylene

Propylene was polymerized in the same manner as Example 1. As a result, the yield of the polymer was 129 g. The polymerization activity was 538 kg-PP/g-Ti. The polymer had [η] of 1.13 dl/g and the stereospecificity [mmmm] of 96.6%.

INDUSTRIAL UTILITY

The present invention can provide a solid catalyst component and a catalyst for olefin polymerization which maintain high stereospecificity with a high activity but do not use an electron donor having problems of safety and hygiene, and methods for producing them.

Further an electron donor used in the present invention may be cheaper and easier to be synthesized.

What is claimed is:

1. A solid catalyst component for olefin polymerization comprising titanium, magnesium and a compound of the general formula (I);

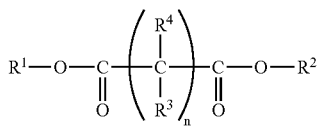

wherein $R^1$ and $R^2$ are independently a $C_3$ straight or branched hydrocarbon group, $R^3$ is hydrogen, $R^4$ is a $C_{1-4}$ straight or branched hydrocarbon group, and n is an integer of 1 to 10.

2. A catalyst for olefin polymerization comprising,
   (A) the solid catalyst component for olefin polymerization of claim 1, and
   (B) an organic aluminium compound.

3. A catalyst for olefin polymerization of claim 2, wherein the catalyst further comprises an electron donor (C).

4. A catalyst for olefin polymerization of claim 3, wherein the electron donor is an organic silicon compound.

5. A solid catalyst component for olefin polymerization of claim 1, wherein n is 1, $R^3$ is hydrogen, and $R^4$ is methyl or i-propyl in the general formula (I).

6. A method of polymerizing olefins comprising polymerizing by contacting an olefin with a catalytically effective amount of the catalyst of claim 2.

7. A method of producing a solid catalyst component for olefin polymerization comprising bringing at least a titanium compound, a magnesium compound and a compound of the general formula (I) into contact with each other at 120° C. to 150° C.;

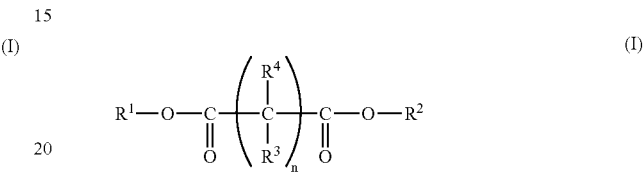

wherein $R^1$ and $R^2$ are independently a $C_3$ straight or branched hydrocarbon group, $R^3$ is hydrogen, $R^4$ is a $C_{1-4}$ straight or branched hydrocarbon group, and n is an integer of 1 to 10.

8. A method of producing a solid catalyst component for olefin polymerization of claim 7, wherein the method further comprises washing the component obtained by the contact with an inert solvent at 100° C. to 150° C.

* * * * *